(12) United States Patent
Palmertz et al.

(10) Patent No.: US 6,363,306 B1
(45) Date of Patent: Mar. 26, 2002

(54) SAFETY DEVICE FOR VEHICLES

(75) Inventors: Camilla Palmertz; Jörgen Saméus, both of Västra Frölunda (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/331,386

(22) PCT Filed: Dec. 18, 1997

(86) PCT No.: PCT/SE97/02151

§ 371 Date: Sep. 2, 1999

§ 102(e) Date: Sep. 2, 1999

(87) PCT Pub. No.: WO98/29280

PCT Pub. Date: Jul. 9, 1998

(30) Foreign Application Priority Data

Dec. 19, 1996 (SE) .............................................. 9604671

(51) Int. Cl.⁷ .......................... B60R 21/00; B60R 21/33
(52) U.S. Cl. ...................................... 701/45; 280/728.1
(58) Field of Search ........................ 701/45; 280/728.1, 280/734, 801.1, 806, 755, 756

(56) References Cited

U.S. PATENT DOCUMENTS

| | | | |
|---|---|---|---|
| 4,715,468 A | | 12/1987 | Baumann et al. ......... 73/504.16 |
| 4,784,237 A | * | 11/1988 | Condne et al. .............. 180/268 |
| 4,975,850 A | * | 12/1990 | Diller ........................... 701/45 |
| 5,014,810 A | * | 5/1991 | Mattes et al. ................ 180/268 |
| 5,021,678 A | * | 6/1991 | Diller ......................... 307/10.1 |
| 5,251,483 A | | 10/1993 | Soderkvist ................... 180/271 |
| 5,394,328 A | * | 2/1995 | Huang .......................... 701/45 |
| 5,449,198 A | * | 9/1995 | Jeenicke et al. ............. 280/735 |
| 5,483,447 A | * | 1/1996 | Jeenicke et al. .............. 701/45 |
| 5,490,066 A | * | 2/1996 | Gioutsos et al. ............... 701/45 |
| 5,610,575 A | * | 3/1997 | Gioutsos ..................... 340/429 |
| 5,620,203 A | * | 4/1997 | Jeenicke et al. ............. 280/735 |
| 5,890,084 A | * | 3/1999 | Halasz et al. ................. 701/45 |
| 6,055,472 A | * | 4/2000 | Breunig et al. ............... 701/45 |

FOREIGN PATENT DOCUMENTS

| | | |
|---|---|---|
| DE | 3604216 A1 | 8/1987 |
| EP | 0 430 813 A1 | 6/1991 |
| EP | 0 707 193 A2 | 4/1996 |
| GB | 2 314 187 A | 12/1997 |
| WO | 87/05570 | 9/1987 |
| WO | 97/33774 | 9/1997 |
| WO | 97/33775 | 9/1997 |
| WO | 97/49571 | 12/1997 |

* cited by examiner

*Primary Examiner*—Michael J. Zanelli
*Assistant Examiner*—Eric M. Gibson
(74) *Attorney, Agent, or Firm*—Kilpatrick Stockton LLP

(57) ABSTRACT

Safety devices and methods of detecting the rotation of a vehicle are disclosed. The safety devices include micromechanical gyros for determining the angular position and angular speed of rotation of the vehicle about one of its axes, a control unit for comparing the angular position and angular speed of rotation with predetermined threshold values for those values in which at least one of the threshold values is variable and is based upon a predetermined operational condition of the vehicle, and at least one protective device actuatable by the control unit based upon that comparison. The methods disclosed include determining the angular position and angular speed of rotation of the vehicle about at least one axis, comparing the angular position and angular speed of rotation with predetermined threshold values for those values, at least one of the threshold values being variable and based upon at least one predetermined operational condition for the vehicles, and actuating at least one protective device based upon that comparison.

25 Claims, 3 Drawing Sheets

SAFETY DEVICE FOR VEHICLES

FIELD OF THE INVENTION

The present invention relates to a safety device for vehicles. In particular, the present invention is intended to detect a state in a vehicle which corresponds to the vehicle rotating about its longitudinal axis (so called "roll-over"). The present invention also relates to a method utilizing such safety device.

BACKGROUND OF THE INVENTION

In connection with motor vehicles, there are certain kinds of accidents where the vehicle tilts so heavily that it rolls about its longitudinal axis. This, of course, causes great risks of injuries to those travelling in the vehicle. Recently, safety systems have thus been designed which comprise a sensor arranged to detect the presence of such a "roll-over" state. Such a sensor can be connected to a control unit, which in turn is connected to some kind of protective device, which can be activated to protect those travelling in the vehicle when the vehicle rolls over. An example of such a safety device is a safety bar intended for open-top vehicles, which during roll-over is unfolded from a folded-away position to a position where it extends across the passenger compartment, and thus protects the passengers.

For reasons of safety, it is desirable to detect this roll-over state in a reliable manner. In particular, it must be possible to detect such a state at an early stage during an accident, and in a manner such that it can be separated from other similar states of the vehicle. In this way, it is possible to prevent unnecessary activation of safety devices in the vehicle.

In connection with safety systems of the above-mentioned type, it is known to utilize a sensor which detects the angle of inclination of the vehicle relative to the horizontal plane. If the inclination of the vehicle exceeds a certain predetermined threshold value, a signal can be generated which in turn activates a safety device.

A previously known system for detecting a roll-over state in a vehicle, and for activation of a safety bar if such a state is present, is shown in document European Patent No. 430,813. This system comprises a sensor of the gyrometer-kind, and accelerometers for detecting side and vertical acceleration of the vehicle. Using the signals from the respective sensors, the system can thus determine whether the vehicle is about to roll over. In particular, the angular or rotational speed of the vehicle is detected using the gyrometer, i.e. relative to the horizontal plane. Additionally, the system is arranged to determine whether the ratio between the side and the vertical acceleration exceeds a certain threshold value. If this is the case, the signal is integrated with respect to the angular speed which is detected using the gyrometer. If the signal which is obtained from this integration, and which indicates a value of the current angle of the vehicle, exceeds a certain threshold value, a safety device in the form of a safety bar will be activated.

However, although this previously known system does, in principle, provide an efficient function, it has a drawback in that it does not always sufficiently reliably detect whether the vehicle is about to roll over. Furthermore, there is also a risk that this state is not detected rapidly enough during the course of an accident.

The object of the present invention is to provide an improved device for quick and reliable detection of a rollover-state in a vehicle with, in particular, the above-mentioned drawbacks being eliminated.

SUMMARY OF THE INVENTION

In accordance with the present invention, this and other objects have now been realized by the invention of a safety device for detecting the rotation of a vehicle having a longitudinal axis, a transverse axis and a steering wheel comprising angular position means for determining the angular position and angular speed of rotation of the vehicle about at least one of the longitudinal axis and the transverse axis, a control unit for comparing the angular position and angular speed of rotation with predetermined threshold values for the angular position and the angular speed of rotation, at least one of the threshold values being variable and based upon at least one predetermined operational condition of the vehicle, and at least one protective device actuatable by the control unit based upon the comparison.

In accordance with one embodiment of the safety device of the present invention, the control unit includes means for comparing the angular speed of rotation about the longitudinal axis with a first predetermined threshold value, and if the angular speed of rotation about the longitudinal axis exceeds the first predetermined threshold value, comparing the angular position about the longitudinal axis with a second predetermined threshold value, the second predetermined threshold value being variable and based upon the magnitude of the angular speed of rotation, and if the angular position about the longitudinal axis exceeds the second predetermined threshold value, actuating the at least one protective device.

In accordance with another embodiment of the safety device of present invention, the safety device includes a first transducer for determining the side acceleration of the vehicle, the control unit including means for comparing the side acceleration to a third predetermined threshold value and if the side acceleration exceeds the predetermined threshold value, comparing the angular position about the longitudinal axis with a fourth predetermined value, the fourth predetermined threshold value being variable and based upon the side acceleration, and if the angular position about the longitudinal axis exceeds the fourth predetermined threshold value, calculating the time during which the side acceleration has exceeded the third predetermined threshold value, comparing the time during which the side acceleration has exceeded the third predetermined threshold value with a fifth predetermined threshold value, the fifth predetermined threshold value being variable and based upon the side acceleration and the angular position, and if the time during which the side acceleration has exceeded the third predetermined threshold value exceeds the fifth predetermined threshold value, actuating the at least one protective device.

In accordance with another embodiment of the safety device of the present invention, the safety device includes a second transducer for determining the angular position of the steering wheel, and a third transducer for determining the velocity of the vehicle, the control unit including means for comparing the angular position about the longitudinal axis with a sixth predetermined threshold value, and if the angular position about the longitudinal axis exceeds the sixth predetermined threshold value, comparing the velocity of the vehicle with a seventh predetermined threshold value, the seventh predetermined threshold value being variable and based upon the angular position about the longitudinal axis, and if the velocity of the vehicle exceeds the seventh predetermined threshold value, comparing the angular position of the steering wheel with an eighth predetermined threshold value, the eighth predetermined threshold value being variable and based upon the angular position and the velocity of the vehicle, and if the angular position of the steering wheel exceeds the eighth predetermined threshold value, actuating the at least one protective device. Preferably, the control unit includes means for determining the angular velocity of the steering wheel with respect to the direction of turning of the steering wheel, and for comparing the angular position about the longitudinal axis with a ninth predetermined threshold value, and if the angular position about the longitudinal axis exceeds the ninth predetermined threshold value, comparing the speed of the vehicle with a tenth predetermined threshold value, the tenth predetermined threshold value being variable and based upon the angular position about the longitudinal axis, and if the speed of the vehicle exceeds the tenth predetermined threshold value, comparing the angular velocity of the steering wheel with an eleventh predetermined threshold value, the eleventh predetermined threshold value being variable and based upon the angular position and the absolute value of the speed of the vehicle, and if the angular velocity of the steering wheel exceeds the eleventh predetermined threshold value, actuating the at least one protective device.

In accordance with another embodiment of the safety device of the present invention, the control unit includes means for comparing the angular velocity about the transverse axis with a twelfth predetermined threshold value, and if the angular velocity about the transverse axis exceeds the twelfth predetermined threshold value, comparing the angular velocity about the transverse axis with a thirteenth predetermined threshold value, the thirteenth predetermined threshold value being variable and based upon the angular velocity, and if the angular velocity about the transverse axis exceeds the thirteenth predetermined threshold value, actuating the at least one protective device.

In accordance with another embodiment of the safety device of the present invention, the safety device includes a third transducer for determining the acceleration of the vehicle in the longitudinal direction, the control unit including means for comparing the acceleration with a fourteenth predetermined threshold value, and if the acceleration exceeds the fourteenth predetermined threshold value, comparing the angular position about the transverse axis with a fifteenth predetermined threshold value, the fifteenth predetermined threshold value being variable and based upon the acceleration, and if the angular position about the transverse axis exceeds the fifteenth predetermined threshold value, comparing the time during which the acceleration exceeds the fourteenth predetermined threshold value with a sixteenth predetermined threshold value, the sixteenth predetermined threshold value being variable and based upon the acceleration and the angular position about the transverse axis, and if the time during which the acceleration exceeds the fourteenth predetermined threshold value exceeds the sixteenth predetermined threshold value, actuating the at least one protective device.

In accordance with another embodiment of the safety device of the present invention, the control unit includes means for comparing the angular acceleration about the transverse axis with a seventeenth predetermined threshold value, and if the angular acceleration about the transverse axis exceeds the seventeenth predetermined threshold value, comparing the time during which the angular acceleration about the transverse axis exceeds the seventeenth predetermined threshold value with an eighteenth predetermined threshold value, the eighteenth predetermined threshold value being variable and based upon the angular acceleration about the transverse axis, and if the time during which the angular acceleration about the transverse axis exceeds the seventeenth predetermined threshold value exceeds the eighteenth predetermined threshold value, comparing the angular velocity about the longitudinal axis with a nineteenth predetermined threshold value, the nineteenth predetermined threshold value being variable and based upon the angular acceleration about the transverse axis and the time during which the angular acceleration about the transverse axis exceeds the seventeenth predetermined threshold value, and if the angular velocity about the longitudinal axis exceeds the nineteenth predetermined threshold value, comparing the angular position of the vehicle about the longitudinal axis with a twentieth predetermined threshold value, the twentieth predetermined threshold value being variable and based upon the angular acceleration about the transverse axis, the time during which the angular acceleration exceeds the seventeenth predetermined threshold value, and the angular velocity about the longitudinal axis, and if the angular position about the longitudinal axis exceeds the twentieth predetermined threshold value, actuating the at least one protective device.

In accordance with another embodiment of the safety device of the present invention, the control unit includes means for comparing the angular acceleration of the vehicle about the transverse axis with a twenty-first predetermined threshold value, and if the angular acceleration about the transverse axis exceeds the twenty-first predetermined threshold value, comparing the time during which the angular acceleration exceeds the twenty-first predetermined threshold value with a twenty-second predetermined threshold value, the twenty-second predetermined threshold value being variable and based upon the angular acceleration about the transverse axis, and if the time during which the angular acceleration exceeds the twenty-first predetermined threshold value exceeds the twenty-second predetermined threshold value, comparing the angular velocity about the transverse axis with a twenty-third predetermined threshold value, the twenty-third predetermined threshold value being variable and based upon the angular acceleration about the transverse axis and the time during which the angular acceleration about the transverse axis exceeds the twenty-first predetermined threshold value, and if the angular velocity about the transverse axis exceeds the twenty-third predetermined threshold value, comparing the angular position of the vehicle with respect to the transverse axis with a twenty-fourth predetermined threshold value, the twenty-fourth predetermined threshold value being variable and based upon the angular acceleration about the transverse axis, the time during which the angular acceleration about the transverse axis exceeds the twenty-first predetermined threshold value and the angular velocity about the transverse axis, and if the angular position with respect to the transverse axis exceeds the twenty-fourth predetermined threshold value, actuating the at least one protective device.

In accordance with another embodiment of the safety device of the present invention, the angular position means comprises at least one micromechanical gyro for detecting the angular velocity of the vehicle about the at least one of the longitudinal and transverse axes, the micromechanical gyro being connected to the control unit.

In accordance with the present invention, a safety device has been provided for detecting the rotation of a vehicle having a longitudinal axis and a transverse axis, comprising a transducer for determining the side acceleration of the vehicle, a control unit for comparing the side acceleration to a first predetermined threshold value, and if the side acceleration exceeds the first predetermined threshold value, comparing the time during which the side acceleration exceeds the first predetermined threshold value with a second predetermined threshold value, and at least one protective device actuatable by the control unit if the time during which the side acceleration exceeds the first predetermined threshold value exceeds the second predetermined threshold value. Preferably, the second predetermined threshold value is variable and based upon the side acceleration.

In accordance with the present invention, a safety device has been devised for detecting the rotation of a vehicle having a longitudinal axis comprising a transducer for determining the angular acceleration of the vehicle about the longitudinal axis, a control unit for comparing the angular acceleration about the longitudinal axis with a first predetermined threshold value, the first predetermined threshold value being variable and based upon the positional energy of the vehicle which must be overcome for the vehicle to roll over, and at least one protective device actuatable by the control unit if the angular acceleration about the longitudinal axis exceeds the first predetermined threshold value.

In accordance with the method of the present invention, a method has been devised for detecting the rotation of a vehicle including a longitudinal axis, a transverse axis and a steering wheel, the method comprising determining the angular position and the angular speed of rotation of the vehicle about at least one of the longitudinal axis and the transverse axis, comparing the angular position and the angular speed of rotation with predetermined threshold values for the angular position and the angular speed of rotation, at least one of the threshold values being variable and based upon at least one predetermined operational condition for the vehicle, and actuating at least one protective device based upon the comparison. Preferably, the method includes comparing the angular velocity of the vehicle about the longitudinal axis with a first predetermined threshold value, and if the angular velocity about the longitudinal axis exceeds the first predetermined threshold value, comparing the angular position of the vehicle about the longitudinal axis with a second predetermined threshold value, the second predetermined threshold value being variable and based upon the angular velocity about the longitudinal axis, and if the angular position about the longitudinal axis exceeds the second predetermined threshold value, actuating the at least one protective device.

In accordance with one embodiment of the method of the present invention, the method includes comparing the side acceleration of the vehicle with a third predetermined threshold value, and if the side acceleration exceeds the third predetermined threshold value, comparing the angular position of the vehicle with a fourth predetermined threshold value, the fourth predetermined threshold value being variable and based upon the side acceleration, and if the angular position of the vehicle about the transverse axis exceeds the fourth predetermined threshold value, comparing the time during which the side acceleration exceeds the third predetermined threshold value exceeds a fourth predetermined threshold value, the fourth predetermined threshold value being variable and based upon the side acceleration and the angular position of the vehicle about the transverse axis, and if the time during which the side acceleration exceeds the third predetermined threshold value exceeds the fourth predetermined threshold value, actuating the at least one protective device.

In accordance with another embodiment of the method of the present invention, the method includes comparing the angular position of the vehicle about the longitudinal axis with a fifth predetermined threshold value, and if the angular position about the longitudinal axis exceeds the fifth predetermined threshold value, comparing the absolute value of the velocity of the vehicle in the longitudinal direction with a sixth predetermined threshold value, the sixth predetermined threshold value being variable and based upon the angular position of the vehicle about the longitudinal axis, and if the absolute value of the velocity in the longitudinal direction exceeds the sixth predetermined threshold value, comparing the angular position of the steering wheel with a seventh predetermined threshold value, the seventh predetermined threshold value being variable and based upon the angular position of the vehicle about the longitudinal axis and the absolute value of the velocity of the vehicle in the longitudinal direction, and if the angular position of the steering wheel exceeds the seventh predetermined threshold value, actuating the at least one protective device.

In accordance with another embodiment of the method of the present invention, the method includes comparing the angular position of the vehicle about the longitudinal axis with an eighth predetermined threshold value, and if the angular position of the vehicle about the longitudinal axis exceeds the eighth predetermined threshold value, comparing the absolute value of the velocity of the vehicle in the longitudinal direction with a ninth predetermined threshold value, the ninth predetermined threshold value being variable and based upon the angular position of the vehicle about the longitudinal axis, and if the absolute value of the velocity of the vehicle in the longitudinal direction exceeds the ninth predetermined threshold value, comparing the angular velocity of the steering wheel with a tenth predetermined threshold value, the tenth predetermined threshold value being variable and based upon the angular position of the vehicle about the longitudinal axis and the absolute value of the velocity of the vehicle in the longitudinal direction, and if the angular velocity of the steering wheel exceeds the tenth predetermined threshold value, actuating the at least one protective device.

In accordance with another embodiment of the method of the present invention, the method includes comparing the angular velocity of the vehicle about the transverse axis with an eleventh predetermined threshold value, and if the angular velocity of the vehicle about the transverse axis exceeds the eleventh predetermined threshold value, comparing the angular position of the vehicle about the transverse axis with a twelfth predetermined threshold value, the twelfth predetermined threshold value being variable and based upon the magnitude of the angular velocity of the vehicle about the transverse axis, and if the angular position of the vehicle about the transverse axis exceeds the twelfth predetermined threshold value, actuating the at least one protective device.

In accordance with another embodiment of the method of the present invention, the method includes comparing the acceleration of the vehicle in the longitudinal direction with a thirteenth predetermined threshold value, and if the acceleration of the vehicle in the longitudinal direction exceeds the thirteenth predetermined threshold value, comparing the angular position of the vehicle about the transverse axis with a fourteenth predetermined threshold value, the fourteenth predetermined threshold value being variable and based upon the acceleration of the vehicle in the longitudinal direction, and if the angular position of the vehicle about the transverse axis exceeds the fourteenth predetermined threshold value, comparing the time during which the acceleration of the vehicle in the longitudinal direction exceeds the thirteenth predetermined threshold value with a fifteenth predetermined threshold value, the fifteenth predetermined threshold value being variable and based upon the acceleration of the vehicle in the longitudinal direction and the angular position of the vehicle, and if the time during which the acceleration of the vehicle in the longitudinal direction exceeds the thirteenth predetermined threshold value exceeds the fifteenth predetermined threshold value, actuating the at least one protective device.

In accordance with another embodiment of the method of the present invention, the method includes comparing the angular acceleration of the vehicle in the longitudinal direction with a sixteenth predetermined threshold value, and if the angular acceleration of the vehicle in the longitudinal direction exceeds the sixteenth predetermined threshold value, comparing the time during which the angular acceleration of the vehicle in the longitudinal direction exceeds the sixteenth predetermined threshold value with a seventeenth predetermined threshold value, the seventeenth predetermined threshold value being variable and based upon the angular acceleration of the vehicle in the longitudinal direction, and if the time during which the angular acceleration of the vehicle in the longitudinal direction exceeds the seventeenth predetermined threshold value, comparing the angular velocity of the vehicle about the longitudinal axis with an eighteenth predetermined threshold value, the eighteenth predetermined threshold value being variable and based upon the angular acceleration of the vehicle in the longitudinal direction and the time during which the angular acceleration in the longitudinal direction exceeds the sixteenth predetermined threshold value, and if the angular velocity of the vehicle about the longitudinal axis exceeds the eighteenth predetermined threshold value, comparing the angular position of the vehicle about the longitudinal axis with a nineteenth predetermined threshold value, the nineteenth predetermined threshold value being variable and based upon the angular acceleration of the vehicle in the longitudinal direction, the time during which the angular acceleration of the vehicle in the longitudinal direction exceeds the sixteenth predetermined threshold value and the angular velocity of the vehicle about the longitudinal axis, and if the angular position of the vehicle about the longitudinal axis exceeds the nineteenth predetermined threshold value, actuating the at least one protective device.

In accordance with another embodiment of the method of the present invention, the method includes comparing the angular acceleration of the vehicle in the transverse direction with a twentieth predetermined threshold value, and if the angular acceleration of the vehicle in the transverse direction exceeds the twentieth predetermined threshold value, comparing the time during which the angular acceleration of the vehicle in the transverse direction exceeds the twentieth predetermined threshold value with a twenty-first predetermined threshold value, the twenty-first predetermined threshold value being variable and based upon the angular acceleration of the vehicle in the transverse direction, and if the time during which the angular acceleration of the vehicle in the transverse direction exceeds the twentieth predetermined threshold value exceeds the twenty-first predetermined threshold value, comparing the angular velocity of the vehicle about the longitudinal axis with a twenty-second predetermined threshold value, the twenty-second predetermined threshold value being variable and based upon the angular acceleration of the vehicle in the transverse direction and the time during which the angular acceleration of the vehicle in the transverse direction exceeds the twentieth predetermined threshold value, and if the angular velocity of the vehicle about the longitudinal axis exceeds the twenty-second predetermined threshold value, comparing the angular position of the vehicle about the transverse axis with a twenty-third predetermined threshold value, the twenty-third predetermined threshold value being variable and based upon the angular acceleration of the vehicle in the transverse direction, the time during which the angular acceleration of the vehicle in the transverse direction exceeds the twentieth predetermined threshold value and the angular velocity of the vehicle about the longitudinal axis, and if the angular position of the vehicle and of the transverse axis exceeds the twenty-third predetermined threshold value, actuating the at least one protective device.

In accordance with the present invention, a method has also been devised for detecting the rotation of a vehicle including a longitudinal axis and a transverse axis, the method comprising determining the side acceleration of the vehicle, comparing the side acceleration of the vehicle with a third predetermined threshold value, and if the side acceleration exceeds the third predetermined threshold value, comparing the time during which the side acceleration exceeds the third predetermined threshold value with a fourth predetermined threshold value, and actuating at least one protective device if the time during which the side acceleration exceeds the third predetermined threshold value exceeds the fourth predetermined threshold value.

In accordance with the present invention, a method has been devised for detecting the rotation of a vehicle including a longitudinal axis, the method comprising determining the angular acceleration of the vehicle about the longitudinal axis, determining a value corresponding to the rotational energy of the vehicle about the longitudinal axis, comparing the value of the rotational energy of the vehicle with a predetermined threshold value, the predetermined threshold value being variable and based upon the positional energy of the vehicle which must be overcome for the vehicle to roll over, and actuating at least one protective device if the value of the rotational energy exceeds the predetermined threshold value.

The present invention is intended to detect rotation of a vehicle about its longitudinal and/or its latitudinal or transverse axis, and for the activation of at least one safety device in response to said detection. The present invention comprises means for determining the angular position of the vehicle about at least one of these axes, and the angular velocity of rotation, and a control unit which is arranged for the above-mentioned activation if certain predetermined threshold conditions relative to the operational state of the vehicle are fulfilled. The present invention is based on the principle that at least one of the threshold conditions is variable, and can be chosen depending on at least one predetermined operational state of the vehicle. In this manner, a quick and reliable detection of the roll-over state is obtained.

In a preferred embodiment of the present invention, a micromechanical gyro is utilized to detect the angular velocity of rotation of the vehicle.

BRIEF DESCRIPTION OF THE DRAWINGS

The present invention will be described in more detail with reference to the following detailed description, which refers to the appended drawings, in which.

DETAILED DESCRIPTION

The present invention is particularly, but not exclusively, suitable for use in connection with motor vehicles and is intended to detect a state of the vehicle in which the vehicle is considered to be about to rotate and roll over mainly about its longitudinal axis. When detecting this so-called roll-over state, it is desirable that a safety device, for example a safety bar or an airbag, is activated so that injuries to those travelling in the vehicle can be minimized.

Figure 1:
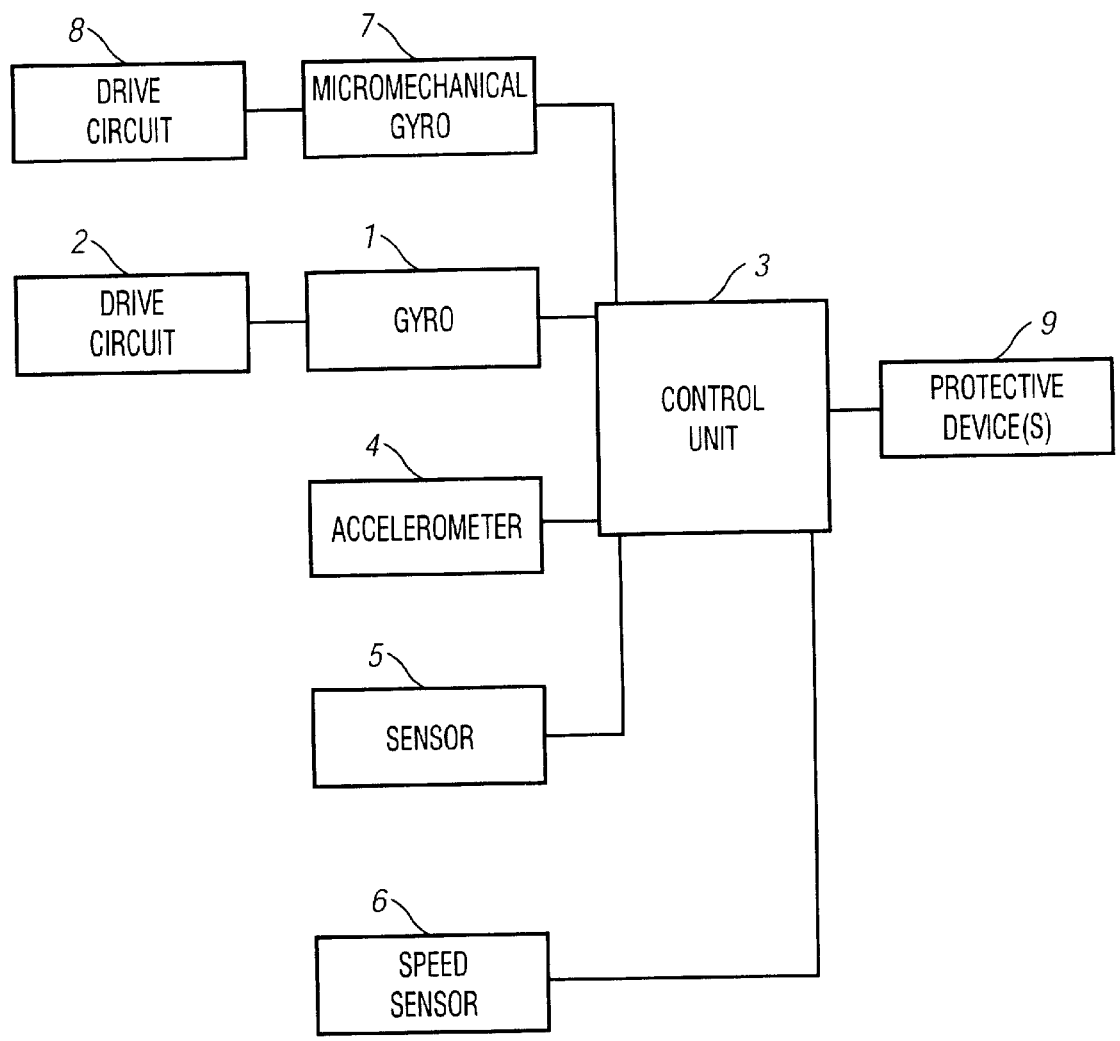
FIG. 1 is a simplified schematic diagram, which shows a device according to the present invention.

FIG. 1 shows a principle diagram of the present invention. The present invention is intended to be arranged in a motor vehicle, and in a preferred embodiment comprises a sensor in the form of a micromechanical gyro 1. This is a type of sensor which, as such, is previously known, for example, as shown in U.S. Pat. No. 5,251,483 and comprises a resonator with a tuning fork-like component of a piezoelectrical material, comprising two bars which are connected to a base section which is fixedly attached to the vehicle. The bars can be caused to vibrate in the horizontal plane using suitable drive circuits. If the vehicle, and thus also the gyro 1, starts to rotate about its longitudinal axis, a vibration with a component in the vertical direction will also be generated. This vibration will constitute a measurement of the current speed of rotation.

According to the present invention, the gyro 1 is connected to a drive circuit 2 for generating a vibration of a certain frequency in the gyro 1. Additionally, the gyro 1 is connected to a control unit 3, which preferably is computer based, and which comprises circuits by means of which the vibrations of the gyro 1 can be detected (which in itself is previously known from the above-mentioned U.S. patent). In this manner, a measurement of the angular velocity $\dot{\phi}$ of a possible twisting or rotational movement of the vehicle about its longitudinal axis can be obtained in the form of a signal in the control unit 3. Instead of a separate drive circuit 2, the control unit 3 can alternatively comprise the drive electronics needed to generate the vibration of the gyro 1.

The control unit 3 is arranged to obtain a value of the current angular position $\phi$ of the gyro 1, during a certain period of time by means of integration, i.e.

$$\varphi = \int_0^T \dot{\varphi} \, dt$$

where the integration from the time 0 to T provides an absolute value of the angular position $\phi$ of the gyro 1, and thus also of the vehicle following a rotation with a certain angular velocity $\dot{\phi}$ about its longitudinal axis (in the following referred to as the x-axis). To the control unit 3 there is also connected at least one accelerometer 4, which is arranged to detect the side-acceleration of the vehicle, i.e. acceleration along the y-axis.

Furthermore, the system according to the present invention preferably comprises a sensor 5, by means of which the angular position $\theta$ of the steering wheel (not shown) of the vehicle can be detected. This sensor 5 for the angle of the steering wheel, which as such is previously known is connected to the control unit 3. The control unit 3 is arranged, by means of derivatives, to determine a value of the angular speed $\dot{\theta}$ when the wheel is turned. There is also a speed sensor 6 connected to the control unit 3 for detecting the speed x of the vehicle in its longitudinal direction.

In a preferred embodiment, the system also comprises a second micromechanical gyro 7. This gyro 7, to which a drive circuit 8 is connected, is of the same type as the above-mentioned gyro 1. but is oriented in the vehicle in such a way that the speed of rotation $\dot{Y}$ of the vehicle about its latitudinal or transverse axis (i.e. the y-axis) can be detected. In a manner corresponding to that which has been explained above, the control unit 3 is arranged, by means of integration, to obtain a value of the current angular position y with respect to the tilt of the vehicle about the y-axis.

As will be explained in detail below, the values regarding the measured angular speeds $\dot{\phi}$ and Y, respectively, side-acceleration ÿ, steering wheel angle $\theta$ and velocity $\dot{x}$ (which are measured continuously over time) and calculated values of the vehicle's angular positions $\phi$ and Y respectively, and the angular velocity of the steering wheel $\theta$, can be utilized in order to determine whether there is a roll-over state. Additionally, the values regarding the angular acceleration $\ddot{\phi}$ about the longitudinal axis of the vehicle (i.e. the x-axis) and the angular acceleration Y about the latitudinal axis of the vehicle (i.e. the y-axis) can be calculated in the control unit 3, and can be utilized to determine whether there is a roll-over state. If that is the case, the control unit 3 will initiate a signal for activation of at least one protective device 9, which, for example, can be a safety bar, an airbag, a safety belt tightener, or a combination of a plurality of such devices. For example, a number of protective devices can be activated in a certain order during roll-over.

Figure 2:
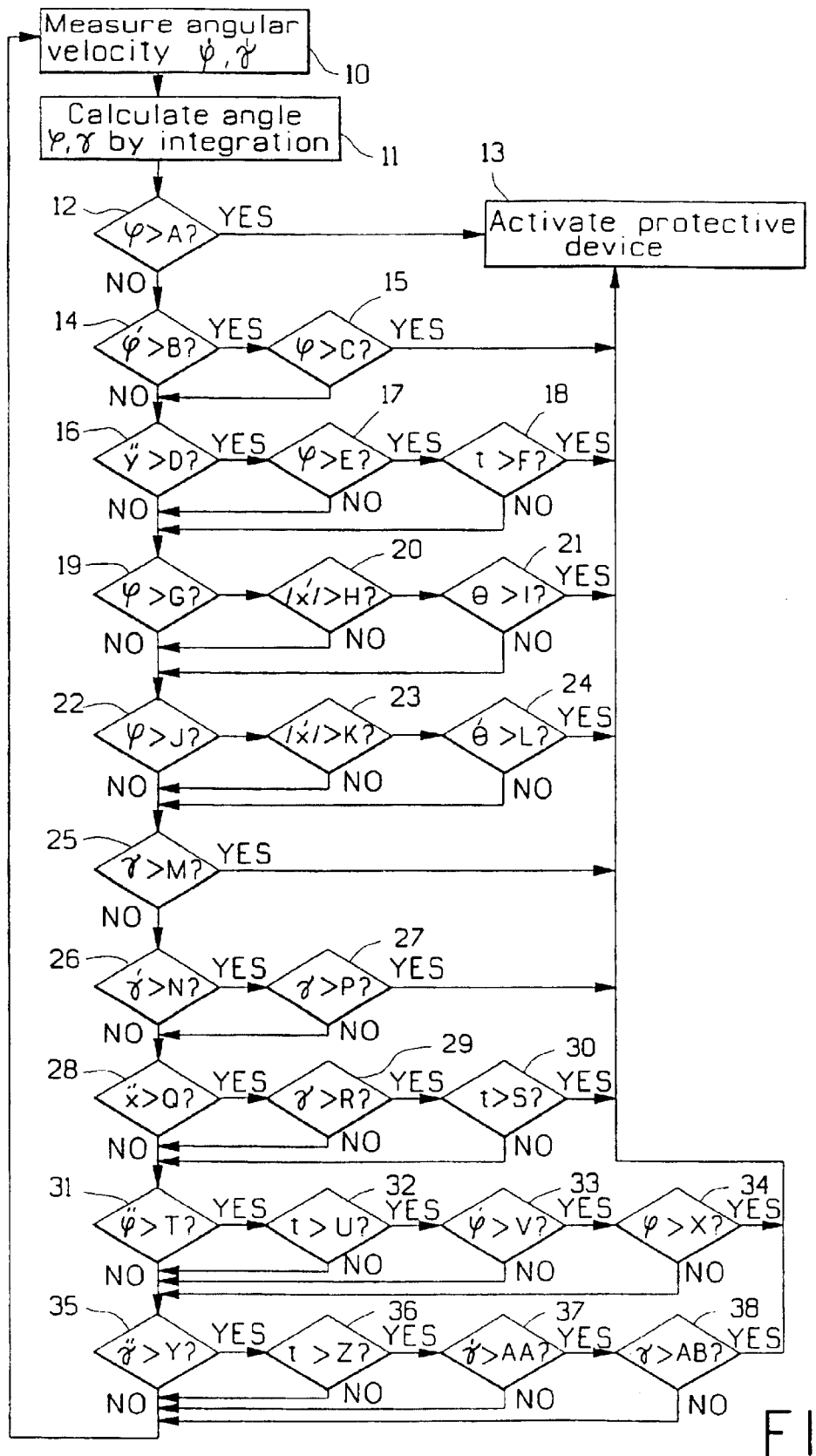
FIG. 2 is a flow chart which shows the manner in which the present invention operates.

FIG. 2 shows a flow chart which illustrates how the present invention works. Initially, the gyros 1 and 7 are fixed in a vehicle, and are utilized for measuring the angular speed $\dot{\phi}$ of the rotation of the vehicle about its longitudinal axis, and the angular velocity $\dot{Y}$ of the rotation about the transverse axis (block 10). By integration in the control unit, a value of the current angular positions $\phi$ and $\gamma$, respectively, of the vehicle are then calculated (block 11). Following this, the control unit 3 determines whether the angle $\phi$ about the x-axis exceeds a predetermined threshold value A (block 12). If this is the case, this is an indication that the vehicle is about to roll over. This causes the control unit to activate the above-mentioned protective device (block 13).

If the angular position $\phi$ does not exceed the threshold value A, a calculation is made as to whether the current value of the angular velocity $\dot{\phi}$ exceeds a certain predetermined threshold value B (block 14). If that is the case, the value of the angular position $\phi$ is compared with a further threshold value C (block 15). If this threshold value C is exceeded, the control unit will activate the protective device (block 13). According to the present invention, the latter threshold value C is variable and depends on the measured value of the angular velocity $\dot{\phi}$. This fact is based on the principle that if the vehicle, for example, rotates about its longitudinal axis with a relatively low angular velocity, a relatively high threshold value C is necessary in order for a roll-over state to be detected reliably. If, on the other hand, the vehicle has a relatively high angular velocity, then the threshold value C can be set relatively low for detecting the roll-over state. In this way, a reliable and early detection of the roll-over state and activation of a protective device is achieved.

If neither the angular velocity about the longitudinal axis exceeds the threshold value B nor the angle exceeds the threshold value C, there is a check as to whether the side acceleration ÿ of the vehicle exceeds a predetermined threshold value D (block 16). If that is the case, there is a check as to whether the current angular position $\phi$ exceeds a further threshold value E (block 17). Similarly to that which has been explained above, this threshold value E depends on the level of the side-acceleration ÿ. If for example, the vehicle has a relatively low side-acceleration, the threshold value E is set relatively high, in order to detect the roll-over state. If, on the other hand, the vehicle has a relatively high side-acceleration, the threshold value E can be set relatively low.

If the angular position φ exceeds the threshold value E (block 17), the control unit checks whether the period of time t during which the side acceleration ÿ has exceeded the threshold value D exceeds an additional threshold value F (block 18). The choice of this latter threshold value F depends on the magnitude of the side-acceleration ÿ and the angular position φ. In the case, for example, of a high side-acceleration and a high value of the angular position, a relatively low value of the threshold value F is necessary in order to determine the presence of a roll-over state. If the value of the period of time t exceeds the threshold value F, the control unit will thus activate the protective device (block 13).

If the side-acceleration ÿ does not exceed the threshold value D or the angle is larger than the threshold value E or the time period t exceeds the threshold value F, there is a check as to whether the angular position φ exceeds a further threshold value G (block 19). If that is the case, the control unit determines whether the absolute value of the speed ẋ of the vehicle in its longitudinal direction is larger than a further threshold value H (block 20). This latter threshold value H depends on the angular position φ in that, for example, a large value of the angular position only requires a relatively low value of the threshold value H in order for the roll-over state to be detected. If the absolute value of the speed of the vehicle ẋ exceeds the threshold value H, a calculation is made in the control unit to determine whether the angle θ of the steering wheel exceeds a certain threshold value I, which in turn depends on the angular position φ and the speed ẋ of the vehicle (block 21). Similar to that which has been explained above, if for example the tilt and the speed of the vehicle are relatively large, a relatively small value of the angle θ of the steering wheel is necessary in order to assume that the roll-over state is present. The direction of the angle θ of the steering wheel (i.e. whether the steering wheel is rotated counter-clockwise or clockwise) is significant, since a vehicle has a higher tendency to roll over when it leans to the left at the same time as the wheels point to the right (or vice versa) than if the vehicle leans in the same direction as the wheels point. If the angle θ of the steering wheel exceeds a certain threshold value 1, the protective device will be activated (block 13).

If the angular position φ does not exceed the threshold value G, the absolute value of the speed of the vehicle ẋ is not larger than the threshold value H, or the angle θ of the steering wheel does not exceed the threshold value I, there is a check as to whether the angular position φ exceeds yet a further threshold value J (block 22). If that is the case, there is a check as to whether the absolute value of the speed ẋ of the vehicle exceeds a threshold value K which depends on the angular position of the vehicle (block 23). If this condition is also satisfied, there is a check as to whether the angular speed θ̇ of the steering wheel, i.e. the angular velocity with which the steering wheel is rotated, exceeds a further threshold value L which depends on the angular position of the vehicle and its speed (block 24). If that is the case, the protective device will be activated (block 13).

If the angular position φ does not exceed the threshold value J, the absolute value of the speed of the vehicle x does not exceed the threshold value K, or the angular velocity θ̇ of the steering wheel does not exceed the threshold value L, there is a check as to whether the angular position γ regarding the rotation of the vehicle about its transverse axis exceeds a further threshold value M (block 25). If that is the case, the control unit will activate the protective device (block 13).

If the angular position γ around the transverse axis is smaller than the threshold value M, a calculation is made as to whether the current value of the angular velocity γ̇ for the rotation about the longitudinal axis exceeds a certain predetermined threshold value N (block 26). If that is the case, the value of the angular position γ is compared to a further threshold value P (block 27). According to this embodiment, this latter threshold value P is variable and depends on the measured value of the angular velocity γ̇. This is based on the principle that if the vehicle, for example, rotates about its longitudinal axis (the y-axis) at a relatively low angular speed, a relatively high threshold value P is needed in order for the roll-over state to be detected reliably. If, on the other hand, the vehicle has a relatively low angular velocity about its longitudinal axis, the threshold value P can be set relatively low in order for the roll-over state to be determined. If the threshold value P is exceeded, the control unit will activate the protective device.

If the angular velocity γ̇ is not larger than N, or the angular position γ is not larger than P, the control unit checks whether the acceleration ẍ of the vehicle in its longitudinal direction exceeds a certain threshold value Q (block 28). If that is the case, there is a check as to whether the angular position γ exceeds yet another threshold value R (block 29). Similar to the explanation above, the threshold value R depends on the level of the acceleration ẍ in the longitudinal direction of the vehicle. If, for example, the vehicle has a relatively low acceleration ẍ, the threshold value R is set relatively high in order to determine the roll-over state. If, on the other hand, the vehicle has a relatively high acceleration ẍ, the threshold value R can be set relatively low.

If the angular position γ exceeds the threshold value R (block 29), the control unit calculates whether the period of time t during which the acceleration ẍ has exceeded the threshold value Q exceeds a certain additional threshold value S (block 30). The choice of this threshold value S depends on the magnitude of the acceleration ẍ and the angular position γ. In case of, for example, a high acceleration and a high value of the angular position, a relatively low value of the threshold value S is needed in order to determine the roll-over state. If the value of the time t exceeds the threshold value S, the control unit will thus activate the protective device (block 13).

If the acceleration ẍ does not exceed the threshold value Q, the angular position γ does not exceed the threshold value R or the time t does not exceed the threshold value S, there is a check as to whether the angular acceleration φ̈ about the transverse axis of the vehicle exceeds a further threshold value T (block 31). If that is the case, there is a check as to whether the period of time during which this threshold value T has been exceeded is larger than a further threshold value U (block 32). Similar to the above explanation, the threshold value U depends on the angular acceleration φ̈ about the transverse axis. If this condition is satisfied as well, there is a check as to whether the current value of the angular velocity φ̇ about the x-axis exceeds a threshold value V (block 33). The choice of this threshold value V depends on the magnitude of the angular acceleration φ̈ about the longitudinal axis and the period of time during which the threshold value U has been exceeded. If the, threshold value V is exceeded, there is a check as to whether the angular position φ exceeds a further threshold value X (block 34). This threshold value X depends on the angular velocity φ̇, the time during which the threshold value U has been exceeded, and the angular acceleration φ. If the threshold value X has been exceeded, the protective device will be activated (block 13).

If the acceleration x does not exceed the threshold value Q, the angular position γ does not exceed the threshold value R, or the time t does not exceed the threshold value S, there is a check as to whether the angular acceleration φ about the longitudinal axis of the vehicle exceeds a further threshold value T (block 31). If that is the case, there is a check as to whether the period of time during which this threshold value T has been exceeded is larger than a further threshold value U (block 32). Similar to the above explanation, the threshold value U depends on the angular acceleration φ about the transverse axis. If this condition is satisfied as well, there is a check as to whether the current value of the angular velocity φ̇ about the x-axis exceeds a threshold value V (block 33). The choice of this threshold value V depends on the magnitude of the angular acceleration φ about the longitudinal axis and the period of time during which the threshold value U has been exceeded. If the threshold value V is exceeded, there is a check as to whether the angular position φ exceeds as further threshold value X (block 34). This threshold value X depends on the angular velocity φ̇, the time during which the threshold value U has been exceeded, and the angular acceleration φ. If the threshold value X has been exceeded, the protective device will be activated (block 13).

If the angular acceleration Ÿ does not exceed the threshold value Y, the time t does not exceed the threshold value Z, the angular velocity Ẏ does not exceed the threshold value AA, or the angular position γ does not exceed the threshold value AB, the system reverts to its initial position, in which the angular velocity φ̇ and Ẏ is measured (block 10).

The above-mentioned variable threshold values C, E, F, H, I, K, L, P, R and S are thus determined depending on the current values of certain selected operational conditions of the vehicle, preferably the angular positions of the vehicle φ and γ, respectively, angular speed, φ̇ and γ̇, respectively, acceleration, ÿ and ẍ, respectively, and speed ẋ, as has been described above. The relationship between the variable threshold values and the operational conditions are preferably stored in the form of tables in the control unit. Furthermore, the threshold values A–AB can be adapted to the type of vehicle in question, when detection of the roll-over state is desired, and similar conditions.

Figure 3:
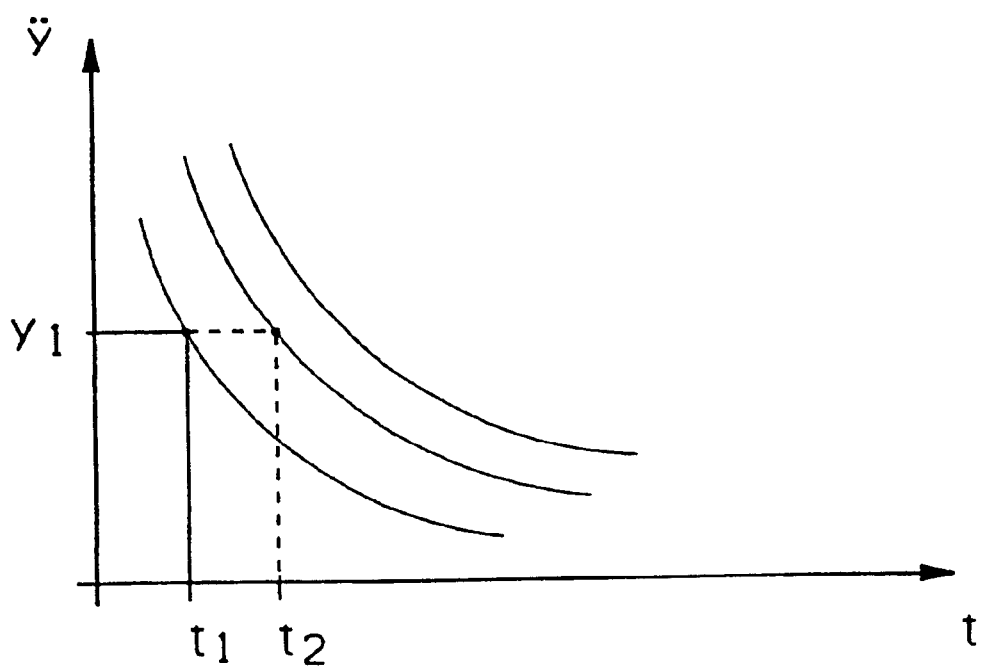
FIG. 3 is a graphical representation of the function of one embodiment of the present invention.

In a particular version of the present invention, a measurement of the side-acceleration ÿ of the vehicle is utilized as the main parameter when determining whether the roll-over state is present or not. This corresponds to the conditions according to blocks 16 and 18 being utilized. FIG. 3 schematically shows how such a detection can be carried out. The figure shows a plurality of diagrams, which each indicate a relationship between the side-acceleration y and the time during which a certain side-acceleration y is present, with each curve corresponding to the current tilt (i.e. angular position φ) of the vehicle. A large tilt of the vehicle corresponds to a curve which is close to the origin in FIG. 3, while a low angle of tilt corresponds to a curve which is farther away from the origin. From the figure, it can be seen that a state where the side-acceleration y has a certain value $y_1$ during a certain time $t_1$ (at a certain angle of tilt) corresponds to the presumed presence of the roll-over state. If the tilt decreases (which corresponds to another curve in FIG. 3), a longer period of time $t_2$ with maintained side-acceleration $y_1$ is instead necessary in order for the roll-over state to be presumed present.

In a further possible version of the present invention, the invention can utilize measurement of the rotational energy of the vehicle about its transverse axis which passes through the center of gravity of the vehicle. This measurement is then utilized to determine whether a rollover state is presumed present. The control unit can then be arranged to determine whether this rotational energy exceeds the position of energy in a rest state where the vehicle does not tilt with respect to its horizontal axis. This condition can also be written as $$(I_{xx}+mL^2)\dot{\phi}^2(t)/2 > mg(h_2-h_1)$$

where $I_{xx}$, is the inertia of the vehicle in the current direction of rotation, m is the mass of the vehicle, L is the distance between the longitudinal axis which runs through the vehicle's center of gravity and the vehicle's point of contact with the ground during rotation, φ is the angular acceleration, and $(h_2-h_1)$ is the difference in height of the center of gravity of the vehicle at rest and when the vehicle has rotated so far that it cannot return to its resting position, respectively. If the control unit thus determines that the rotational energy of the vehicle exceeds a threshold value which corresponds to the positional energy of the vehicle which it is necessary to overcome in order for the vehicle to roll over, the protective device will be activated.

In a further version of the present invention, such a rotational state can be determined using two transducers for determining the angular acceleration about the longitudinal axis of the vehicle. If these transducers are placed sufficiently far out at the sides of the vehicle, and if they simultaneously indicate positive and negative acceleration respectively, this in an indication that the vehicle is rotating about its longitudinal axis. By combining such a measurement with a measurement of the angular position φ of the vehicle about the longitudinal axis and the angular speed φ̇ about the longitudinal axis, the system can determine whether the roll-over state is present.

The present invention is not limited to the examples of embodiments described above and shown in the drawings, but can be varied within the scope of the appended claims. For example, different kinds of protective devices can be utilized to protect those travelling in the vehicle. Furthermore, different kinds of sensors can be utilized for detection of the various operational states of the vehicle. For example, other types of inclination sensors than micromechanical gyros can be utilized.

Furthermore, the control unit does not necessarily need to be arranged to check all of the conditions which are indicated with reference to FIG. 2. A system which, for example, does not utilize the conditions according to blocks 16–30 can also provide a reliable and quick detection of the rollover state. According to a possible version of the present invention, the gyro for detecting the rotation out the transverse axis of the vehicle can also be left out, in which case the conditions according to blocks 25–30 will not be included. Furthermore, the conditions according to blocks 31–38, i.e. those which relate to determining the angular acceleration about the x- and y-axis, respectively, can be left out.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A safety device for detecting the rotation of a vehicle having a longitudinal axis, a transverse axis and a steering wheel comprising:

angular position means for determining the angular position and angular velocity of said vehicle about at least one of said longitudinal axis and said transverse axis, a control unit for comparing said angular position and angular speed of rotation with predetermined threshold values for said angular position and said angular speed of rotation, at least one of said threshold values being variable and based upon at least one predetermined operational condition of said vehicle, and at least one protective device actuatable by said control unit based upon said comparison.

2. The safety device of claim 1 wherein said control unit further comprises:

means for comparing said angular velocity about said longitudinal axis with a first predetermined threshold value, and if said angular velocity about said longitudinal axis exceeds said first predetermined threshold value, comparing said angular position about said longitudinal axis with a second predetermined threshold value, said second predetermined threshold value being variable and based upon the magnitude of said angular velocity, and if said angular position about said longitudinal axis exceeds said second predetermined threshold value, actuating said at least one protective device.

3. The safety device of claim 1 further comprising:

a transducer for determining the side acceleration of said vehicle, said control unit further comprising means for comparing said side acceleration to a first predetermined threshold value, and if said side acceleration exceeds said first predetermined threshold value, comparing said angular position about said longitudinal axis with a second predetermined value, said second predetermined threshold value being variable and based upon said side acceleration, and if said angular position about said longitudinal axis exceeds said second predetermined threshold value, calculating the time during which said side acceleration has exceeded said first predetermined threshold value, comparing said time during which said side acceleration has exceeded said first predetermined threshold value with a third predetermined threshold value, said third predetermined threshold value being variable and based upon said side acceleration and said angular position, and if said time during which said side acceleration has exceeded said first predetermined threshold value exceeds said third predetermined threshold value, actuating at least one protective device.

4. The safety device of claim 1 further comprising:

a first transducer for determining the angular position of said steering wheel, and a second transducer for determining the velocity of said vehicle, said control unit further comprising means for comparing said angular position about said longitudinal axis with a first predetermined threshold value, and if said angular position about said longitudinal axis exceeds said first predetermined threshold value, comparing said speed of said vehicle with a second predetermined threshold value, said second predetermined threshold value being variable and based upon said angular position about said longitudinal axis, and if said speed of said vehicle exceeds said second predetermined threshold value, comparing said angular position of said steering wheel with a third predetermined threshold value, said third predetermined threshold value being variable and based upon said angular position and said speed of said vehicle, and if said angular position of said steering wheel exceeds said third predetermined threshold value, actuating said at least one protective device.

5. The safety device of claim 4 wherein said control unit further comprises:

means for determining the angular velocity of said steering wheel with respect to the direction of turning of said steering wheel and for comparing said angular position about said longitudinal axis with a fourth predetermined threshold value, and if said angular position about said longitudinal axis exceeds said fourth predetermined threshold value, comparing said speed of said vehicle with a fifth predetermined threshold value, said fifth predetermined threshold value being variable and based upon said angular position about said longitudinal axis, and if said speed of said vehicle exceeds said fifth predetermined threshold value, comparing said angular velocity of said steering wheel with a sixth predetermined threshold value, said sixth predetermined threshold value being variable and based upon said angular position and the absolute value of said speed of said vehicle, and if said angular velocity of said steering wheel exceeds said sixth predetermined threshold value, actuating said at least one protective device.

6. The safety device of claim 1 wherein said control unit further comprises:

means for comparing the angular velocity about said transverse axis with a first predetermined threshold value, and if said angular velocity about said transverse axis exceeds said first predetermined threshold value, comparing said angular velocity about said transverse axis with a second predetermined threshold value, said second predetermined threshold value being variable and based upon said angular velocity, and if said angular velocity about said transverse axis exceeds said second predetermined threshold value, actuating said at least one protective device.

7. The safety device of claim 6 further comprising:

a transducer for determining the acceleration of said vehicle in said longitudinal direction, said control unit further comprising means for comparing said acceleration with a third predetermined threshold value, and if said acceleration exceeds said third predetermined threshold value, comparing said angular position about said transverse axis with a fourth predetermined threshold value, said fourth predetermined threshold value being variable and based upon said acceleration, and if said angular position about said transverse axis exceeds said fourth predetermined threshold value, comparing the time during which said acceleration exceeds said third predetermined threshold value with a fifth predetermined threshold value, said fifth predetermined threshold value being variable and based upon said acceleration and said angular position about said transverse axis, and if said time during which said acceleration exceeds said third predetermined threshold value exceeds said fifth predetermined threshold value, actuating said at least one protective device.

8. The safety device of claim 1 wherein said control unit further comprises:

means for determining an angular acceleration about said transverse axis and comparing the angular acceleration about said transverse axis with a first predetermined threshold value, and if said angular acceleration about said transverse axis exceeds said first predetermined threshold value, comparing the time during which said angular acceleration about said transverse axis exceeds said first predetermined threshold value with a second predetermined threshold value, said second predetermined threshold value being variable and based upon said angular acceleration about said transverse axis, and if said time during which said angular acceleration about said transverse axis exceeds said first predetermined threshold value exceeds said second predetermined threshold value, comparing the angular velocity about said longitudinal axis with a third predetermined threshold value, said third predetermined threshold value being variable and based upon said angular acceleration about said transverse axis and said time during which said angular acceleration about said transverse axis exceeds said first predetermined threshold value, and if said angular velocity about said longitudinal axis exceeds said third predetermined threshold value, comparing the angular position of said vehicle about said longitudinal axis with a fourth predetermined threshold value, said fourth predetermined threshold value being variable and based upon the angular acceleration about said transverse axis, said time during which said angular acceleration exceeds said first predetermined threshold value, and said angular velocity about said longitudinal axis, and if said angular position about said longitudinal axis exceeds said fourth predetermined threshold value, actuating said at least one protective device.

9. The safety device of claim 1 wherein said control unit further comprises:

means for determining an angular acceleration of said vehicle about said transverse axis and comparing the angular acceleration of said vehicle about said transverse axis with a first predetermined threshold value, and if said angular acceleration about said transverse axis exceeds said first predetermined threshold value, comparing the time during which said angular acceleration exceeds said first predetermined threshold value with a second predetermined threshold value, said second predetermined threshold value being variable and based upon said angular acceleration about said transverse axis, and if said time during which said angular acceleration exceeds said first predetermined threshold value exceeds said second predetermined threshold value, comparing the angular velocity about said transverse axis with a third predetermined threshold value, said third predetermined threshold value being variable and based upon the angular acceleration about said transverse axis and said time during which said angular acceleration about said transverse axis exceeds said first predetermined threshold value, and if said angular velocity about said transverse axis exceeds said third predetermined threshold value, comparing the angular position of said vehicle with respect to said transverse axis with a fourth predetermined threshold value, said fourth predetermined threshold value being variable and based upon said angular acceleration about said transverse axis, said time during which said angular acceleration about said transverse axis exceeds said first predetermined threshold value and said angular velocity about said transverse axis, and if said angular position with respect to said transverse axis exceeds said fourth predetermined threshold value, actuating said at least one protective device.

10. The safety device of claim 1 wherein said angular position means comprises at least one micromechanical gyro for detecting an angular velocity of said vehicle about said at least one of said longitudinal and transverse axes, said micromechanical gyro being connected to said control unit.

11. A safety device for detecting the rotation of a vehicle having a longitudinal axis and a transverse axis, comprising a transducer for determining the side acceleration of said vehicle, a control unit for comparing said side acceleration to a first predetermined threshold value, and if said side acceleration exceeds said first predetermined threshold value, comparing the time during which said side acceleration exceeds said first predetermined threshold value with a second predetermined threshold value, and at least one protective device actuatable by said control unit if said time during which said side acceleration exceeds said first predetermined threshold value exceeds said second predetermined threshold value.

12. The safety device of claim 11 wherein said second predetermined threshold value is variable and based upon said side acceleration.

13. A safety device for detecting the rotation of a vehicle having a longitudinal axis comprising:

a transducer for determining the angular acceleration of said vehicle about said longitudinal axis, a control unit for comparing said angular acceleration about said longitudinal axis with a first predetermined threshold value, said first predetermined threshold value being variable and based upon the positional energy of said vehicle which must be overcome for said vehicle to roll over, and at least one protective device actuatable by said control unit if said angular acceleration about said longitudinal axis exceeds said first predetermined threshold value.

14. A method for detecting the rotation of a vehicle including a longitudinal axis, a transverse axis and a steering wheel, said method comprising:

determining the angular position and the angular velocity of said vehicle about at least one of said longitudinal axis and said transverse axis, comparing said angular position and said angular velocity with predetermined threshold values for said angular position and said velocity, at least one of said threshold values being variable and based upon at least one predetermined operational condition for said vehicle, and actuating at least one protective device based upon said comparison.

15. The method of claim 14 further comprising:

comparing the angular velocity of said vehicle about said longitudinal axis with a first predetermined threshold value, and if said angular velocity about said longitudinal axis exceeds said first predetermined threshold value, comparing the angular position of said vehicle about said longitudinal axis with a second predetermined threshold value, said second predetermined threshold value being variable and based upon said angular velocity about said longitudinal axis, and if said angular position about said longitudinal axis exceeds said second predetermined threshold value, actuating said at least one protective device.

16. The method of claim 14 further comprising:

comparing a side acceleration of said vehicle with a first predetermined threshold value, and if said side acceleration exceeds said first predetermined threshold value, comparing the angular position about said transverse axis of said vehicle with a second predetermined threshold value, said second predetermined threshold value being variable and based upon said side acceleration, and if said angular position of said vehicle about said transverse axis exceeds said second predetermined threshold value, comparing the time during which said first predetermined threshold value is exceeded with a third predetermined threshold value, said third predetermined threshold value being variable and based upon said side acceleration and said angular position of said vehicle about said transverse axis, and if said time during which said side acceleration exceeds said first predetermined threshold value exceeds said third predetermined threshold value, actuating said at least one protective device.

17. The method of claim 14 further comprising:

comparing the angular position of said vehicle about said longitudinal axis with a first predetermined threshold value, and if said angular position about said longitudinal axis exceeds said first predetermined threshold value, determining an absolute value of the velocity of said vehicle, comparing the absolute value of the velocity of said vehicle in said longitudinal direction with a second predetermined threshold value, said second predetermined threshold value being variable and based upon the angular position of said vehicle about said longitudinal axis, and if said absolute value of said velocity in said longitudinal direction exceeds said second predetermined threshold value, determining an angular position of said steering wheel, comparing the angular position of said steering wheel with a third predetermined threshold value, said third predetermined threshold value being variable and based upon the angular position of said vehicle about said longitudinal axis and the absolute value of said velocity of said vehicle in said longitudinal direction, and if said angular position of said steering wheel exceeds said third predetermined threshold value, actuating said at least one protective device.

18. The method of claim 14 further comprising:

comparing the angular position of said vehicle about said longitudinal axis with a first predetermined threshold value, and if said angular position of said vehicle about said longitudinal axis exceeds said first predetermined threshold value, determining an absolute value of said velocity of said vehicle, comparing the absolute value of said velocity of said vehicle in said longitudinal direction with a second predetermined threshold value, said second predetermined threshold value being variable and based upon the angular position of said vehicle about said longitudinal axis, and if said absolute value of said velocity of said vehicle in said longitudinal direction exceeds said second predetermined threshold value, determining an angular velocity of said steering wheel, comparing the angular velocity of said steering wheel with a third predetermined threshold value, said third predetermined threshold value being variable and based upon the angular position of said vehicle about said longitudinal axis and the absolute value of said velocity of said vehicle in said longitudinal direction, and if said angular velocity of said steering wheel exceeds said third predetermined threshold value, actuating said at least one protective device.

19. A method according to claim 14 further comprising:

comparing the angular velocity of said vehicle about said transverse axis with a first predetermined threshold value, and if said angular velocity of said vehicle about said transverse axis exceeds said first predetermined threshold value, comparing the angular position of said vehicle about said transverse axis with a second predetermined threshold value, said second predetermined threshold value being variable and based upon the magnitude of said angular velocity of said vehicle about said transverse axis, and if said angular position of said vehicle about said transverse axis exceeds said second predetermined threshold value, actuating said at least one protective device.

20. The method of claim 14 further comprising:

determining an acceleration of said vehicle in said longitudinal direction, comparing the acceleration of said vehicle in said longitudinal direction with a first predetermined threshold value, and if said acceleration of said vehicle in said longitudinal direction exceeds said first predetermined threshold value, comparing the angular position of said vehicle about said transverse axis with a second predetermined threshold value, said second predetermined threshold value being variable and based upon the acceleration of said vehicle in said longitudinal direction, and if said angular position of said vehicle about said transverse axis exceeds said second predetermined threshold value, comparing the time during which said acceleration of said vehicle in said longitudinal direction exceeds said first predetermined threshold value with a third predetermined threshold value, said third predetermined threshold value being variable and based upon the acceleration of said vehicle in said longitudinal direction and the angular position of said vehicle, and if said time during which said acceleration of said vehicle in said longitudinal direction exceeds said first predetermined threshold value exceeds said third predetermined threshold value, actuating said at least one protective device.

21. A method according to claim 14 further comprising:

determining an angular acceleration of said vehicle in said longitudinal direction, comparing the angular acceleration of said vehicle in said longitudinal direction with a first predetermined threshold value, and if said angular acceleration of said vehicle in said longitudinal direction exceeds said first predetermined threshold value, comparing the time during which said angular acceleration of said vehicle in said longitudinal direction exceeds said first predetermined threshold value with a second predetermined threshold value, said second predetermined threshold value being variable and based upon said angular acceleration of said vehicle in said longitudinal direction, and if said time during which said angular acceleration of said vehicle in said longitudinal direction exceeds said second predetermined threshold value, comparing the angular velocity of said vehicle about said longitudinal axis with a third predetermined threshold value, said third predetermined threshold value being variable and based upon the angular acceleration of said vehicle in said longitudinal direction and said time during which said angular acceleration in said longitudinal direction exceeds said first predetermined threshold value, and if said angular velocity of said vehicle about said longitudinal axis exceeds said third predetermined threshold value, comparing the angular position of said vehicle about said longitudinal axis with a fourth predetermined threshold value, said fourth predetermined threshold value being variable and based upon said angular acceleration of said vehicle in said longitudinal direction, said time during which said angular acceleration of said vehicle in said longitudinal direction exceeds said first predetermined threshold value and said angular velocity of said vehicle about said longitudinal axis, and if said angular position of said vehicle about said longitudinal axis exceeds said fourth predetermined threshold value, actuating said at least one protective device.

22. A method according to claim 14 further comprising:

determining an angular acceleration of said vehicle in said longitudinal direction, comparing the angular acceleration of said vehicle in said transverse direction with a first predetermined threshold value, and if said angular acceleration of said vehicle in said transverse direction exceeds said first predetermined threshold value, comparing the time during which said angular acceleration of said vehicle in said transverse direction exceeds said twentieth predetermined threshold value with a second predetermined threshold value, said second predetermined threshold value being variable and based upon the angular acceleration of said vehicle in said transverse direction, and if said time during which said angular acceleration of said vehicle in said transverse direction exceeds said first predetermined threshold value exceeds said second predetermined threshold value, comparing the angular velocity of said vehicle about said longitudinal axis with a third predetermined threshold value, said third predetermined threshold value being variable and based upon the angular acceleration of said vehicle in said transverse direction and the time during which said angular acceleration of said vehicle in said transverse direction exceeds said first predetermined threshold value, and if said angular velocity of said vehicle about said longitudinal axis exceeds said third predetermined threshold value, comparing the angular position of said vehicle about said transverse axis with a fourth predetermined threshold value, said fourth predetermined threshold value being variable and based upon said angular acceleration of said vehicle in said transverse direction, said time during which said angular acceleration of said vehicle in said transverse direction exceeds said first predetermined threshold value and said angular velocity of said vehicle about said longitudinal axis, and if said angular position of said vehicle and of said transverse axis exceeds said fourth predetermined threshold value, actuating said at least one protective device.

23. A method for detecting the rotation of a vehicle including a longitudinal axis and a transverse axis, said method comprising:

determining the side acceleration of said vehicle, comparing said side acceleration of said vehicle with a first predetermined threshold value, and if said side acceleration exceeds said first predetermined threshold value, comparing the time during which said side acceleration exceeds said first predetermined threshold value with a second predetermined threshold value, and actuating at least one protective device if said time during which said side acceleration exceeds said first predetermined threshold value exceeds said second predetermined threshold value.

24. A method for detecting the rotation of a vehicle including a longitudinal axis, said method comprising:

determining the angular acceleration of said vehicle about said longitudinal axis, determining a value corresponding to the rotational energy of said vehicle about said longitudinal axis, comparing said value of said rotational energy of said vehicle with a predetermined threshold value, said predetermined threshold value being variable and based upon the positional energy of said vehicle which must be overcome for said vehicle to roll over, and actuating at least one protective device if said value of said rotational energy exceeds said predetermined threshold value.

25. A safety device for detecting the rotation of a vehicle about its longitudinal axis or transverse axis or both, wherein at least one or more protective devices are activated upon the detection, comprising:

means for determining the angular position of the vehicle about at least one of said axes, means for determining the angular velocity of the vehicle about at least one of said axes, a control unit arranged for activation of at least one or more protective devices if one or more certain predetermined threshold values regarding the operating condition of the vehicle are fulfilled, wherein at least one of said threshold values is constituted by a first value that is compared with a second measured value representing the angular position of the vehicle, said first value being variable and based on the instantaneous measured value of at least one predetermined, additional operating condition of the vehicle.

* * * * *